(12) United States Patent
Nickell

(10) Patent No.: US 9,038,804 B1
(45) Date of Patent: May 26, 2015

(54) ROLLER SHELF

(71) Applicant: The Marco Company, Fort Worth, TX (US)

(72) Inventor: Craig Alan Nickell, Aledo, TX (US)

(73) Assignee: THE MARCO COMPANY, Fort Worth, TX (US)

( * ) Notice: Subject to any disclaimer, the term of this patent is extended or adjusted under 35 U.S.C. 154(b) by 76 days.

(21) Appl. No.: 13/708,280

(22) Filed: Dec. 7, 2012

(51) Int. Cl.
*B65G 13/11* (2006.01)
*A47F 5/08* (2006.01)

(52) U.S. Cl.
CPC ...................................... *B65G 13/11* (2013.01)

(58) Field of Classification Search
CPC ........... B65G 13/11; B65G 1/023; A47F 5/08
USPC ............................................ 211/151; 193/37
See application file for complete search history.

(56) References Cited

U.S. PATENT DOCUMENTS

| | | | |
|---|---|---|---|
| 510,088 A | 12/1893 | Pauly, Jr. | |
| 615,127 A | 11/1898 | Baker | |
| 2,099,222 A | 3/1936 | Paxton | |
| 2,581,363 A | 1/1952 | Creedon | |
| 2,594,295 A | 4/1952 | Cushman | |
| 2,801,730 A | 7/1956 | Strickler | |
| 2,852,327 A | 9/1958 | Mason | |
| 2,913,141 A | 11/1959 | Woodruff et al. | |
| 3,559,802 A | 2/1971 | Eidus | |
| 4,214,379 A | 7/1980 | Hope et al. | |
| 4,314,648 A | 2/1982 | Spamer | |
| 4,366,894 A | 1/1983 | Huelster | |
| 4,379,429 A | 4/1983 | Gubbe et al. | |
| 4,606,659 A | 8/1986 | Hogan | |
| 4,752,175 A | 6/1988 | Lichti | |
| 5,078,250 A | 1/1992 | Cole | |
| 5,090,558 A | 2/1992 | Hatouchi | |
| 5,415,272 A | 5/1995 | Boschert et al. | |
| 5,547,329 A | 8/1996 | Hirai et al. | |
| 5,595,310 A | 1/1997 | Spamer et al. | |
| 5,887,732 A | 3/1999 | Zimmer et al. | |
| 5,951,228 A | 9/1999 | Pfeiffer et al. | |
| 6,089,385 A * | 7/2000 | Nozawa | ....................... 211/59.2 |
| 6,389,993 B1 | 5/2002 | Ondrasik | |
| 6,490,983 B1 | 12/2002 | Nicholson et al. | |
| 6,523,664 B2 * | 2/2003 | Shaw et al. | ................. 193/35 R |
| RE38,517 E | 5/2004 | Pfeiffer et al. | |
| 6,755,299 B2 | 6/2004 | Itoh et al. | |
| 7,114,606 B2 * | 10/2006 | Shaw et al. | ................. 193/35 R |
| 8,376,154 B2 * | 2/2013 | Sun | ............................... 211/151 |
| 8,573,379 B2 * | 11/2013 | Brugmann | ...................... 193/37 |
| 8,662,325 B2 * | 3/2014 | Davis et al. | .................... 211/151 |
| 2002/0134643 A1 | 9/2002 | Schmale et al. | |
| 2004/0178156 A1 | 9/2004 | Knorring, Jr. et al. | |
| 2005/0115809 A1* | 6/2005 | Lutz | ........................... 198/860.1 |
| 2006/0180427 A1 | 8/2006 | Deur | |

(Continued)

FOREIGN PATENT DOCUMENTS

JP 11155701 6/1999

*Primary Examiner* — Gene Crawford
*Assistant Examiner* — Thomas Randazzo
(74) *Attorney, Agent, or Firm* — Yee & Associates, P.C.

(57) ABSTRACT

A roller track comprising a base, a tray, and a plurality of rollers. The tray is configured to slide into the base, and comprises a first end, a center portion comprising a plurality of notches, and a second end. The first end and the second end comprise a plurality of slots. The plurality of rollers is configured to engage the plurality of notches.

19 Claims, 9 Drawing Sheets

(56) References Cited

U.S. PATENT DOCUMENTS

| | | |
|---|---|---|
| 2007/0125727 A1 | 6/2007 | Winkler |
| 2008/0145197 A1 | 6/2008 | Taylor et al. |
| 2008/0217143 A1* | 9/2008 | Lawless et al. ............ 198/860.1 |
| 2009/0194386 A1 | 8/2009 | Dohrendorf |
| 2010/0133214 A1* | 6/2010 | Evans .......................... 211/85.8 |
| 2010/0133219 A1* | 6/2010 | Sun ............................... 211/151 |
| 2011/0186401 A1* | 8/2011 | Brugmann ...................... 193/37 |
| 2011/0204012 A1 | 8/2011 | Eguchi et al. |
| 2013/0075352 A1* | 3/2013 | Mitten et al. .................. 211/59.2 |
| 2013/0213916 A1* | 8/2013 | Leahy et al. .................... 211/151 |

* cited by examiner

ROLLER SHELF

BACKGROUND INFORMATION

1. Field

The present disclosure relates generally to product display, and in particular to product display shelves comprising rollers.

2. Background

In retail stores, shelves are necessary for displaying and storing products. When a product is removed from a shelf, a gap remains on the shelf where the product was stored. Remaining products may be stored further back on the shelf, but may be difficult for a consumer to reach. Such product placement may present a safety hazard if a consumer attempts to reach a product by climbing on shelves. Alternatively, the retail store may lose potential revenue if a consumer is unable to reach the desired product. Further, gaps on a shelf may cause the shelf to look disorganized or nearly empty, which may give consumers a negative impression of the retail store.

Accordingly, retail stores such as grocery stores, convenience stores, drug stores, and other retail stores employ individuals to perform "facing." "Facing" comprises moving products already on a shelf towards the front of the shelf for a clean, organized look and consumer convenience. As products are sold, retail stores may also restock products. In restocking, an employee may replenish the products on a shelf. While restocking, the employee may also rotate products with upcoming expiration dates toward the front of the shelf. Both restocking and "facing" require large time investments by retail stores.

As a result, retail stores may purchase equipment to continuously position products at the front of a shelf. Examples of such equipment include gravity feed shelving and push feed shelving. However, such equipment may damage or unnecessarily jostle products. Additionally, such equipment may be noisy, unreliable, unsuited to products of varying sizes and shapes, and costly and difficult to manufacture.

Accordingly, it would be advantageous to have a method and apparatus, which takes into account one or more of the issues discussed above as well as possibly other issues.

SUMMARY

In one illustrative embodiment, a roller track is provided. The roller track comprises a base. The roller track further comprises a tray which is configured to slide into the base. The tray comprises a first end, a center portion comprising a plurality of notches, and a second end. The first end and the second end comprise a plurality of slots. The roller track further comprises a plurality of rollers. The plurality of rollers is configured to engage the plurality of notches.

In another illustrative embodiment, a roller shelf is provided. The roller shelf comprises a first roller track and a second roller track. The first roller track comprises a first base, a first tray, and a first plurality of rollers. The first tray is configured to slide into the first base. The first tray comprises a first end, a first center portion comprising a first plurality of notches, and a second end. The first plurality of rollers is configured to engage the first plurality of notches. The second roller track comprises a second base, a second tray, and a second plurality of rollers. The second tray is configured to slide into the second base. The second tray comprises a third end, a second center portion comprising a second plurality of notches, and a fourth end. The second plurality of rollers is configured to engage the second plurality of notches. The first plurality of rollers is axially offset from the second plurality or rollers.

In yet another illustrative embodiment, a roller track is provided. The roller track comprises a base. The roller track further comprises a tray which is configured to slide into the base. The tray comprises a first end, a center portion comprising a plurality of notches, and a second end. The first end and the second end comprise a plurality of slots, and at least one slot of the plurality of slots comprises a zigzag shape. The roller track further comprises a plurality of rollers. The plurality of rollers is configured to engage the plurality of notches.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
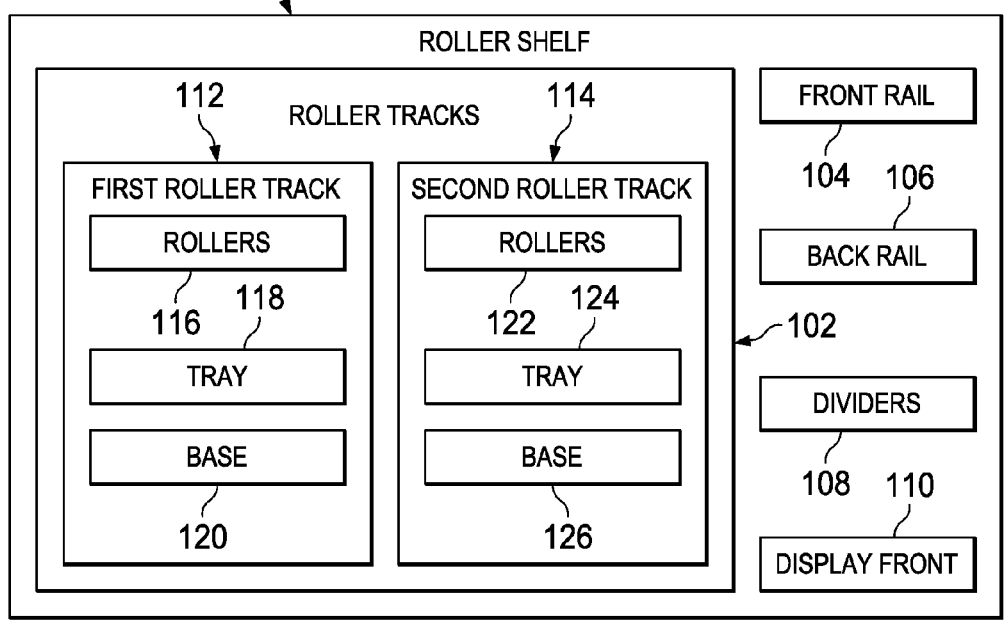
FIG. 1 is an illustration of a block diagram of a roller shelf in accordance with an illustrative embodiment.

FIG. 1 is an illustration of a block diagram of a roller shelf in accordance with an illustrative embodiment. Roller shelf 100 is configured to convey products from the back of roller shelf 100 to the front of roller shelf 100. As depicted, roller shelf 100 comprises roller tracks 102, front rail 104, back rail 106, dividers 108, and display front 110.

As depicted, roller tracks 102 comprises first roller track 112 and second roller track 114. First roller track 112 and second roller track 114 may be identical, or may vary in size, materials, orientation, or in other ways. For example, first roller track 112 may be two inches wide while second roller track 114 may be 3 inches wide. Although this illustrative example depicts two roller tracks, any number of roller tracks may be present in roller shelf 100.

In this illustrative example, first roller track 112 comprises rollers 116, tray 118, and base 120. Rollers 116 are configured to be placed in tray 118. For example, rollers 116 may be configured to be placed into notches provided for rollers 116 in tray 118.

Tray 118 is configured to hold rollers 116 while allowing free rotation of rollers 116. Tray 118 is associated with base 120.

When one component is "associated" with another component, the association is a physical association in these depicted examples. For example, a first component, tray 118, may be considered to be associated with a second component, base 120, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Base 120 is configured to prevent inadvertent removal of rollers 116 from tray 118 during use. Base 120 is also configured to allow free rotation of rollers 116.

Second roller track 114 comprises rollers 122, tray 124, and base 126. Rollers 122 are configured to be placed in tray 124. Tray 124 is configured to hold rollers 122 while allowing free rotation of rollers 122. Tray 124 is associated with base 126. In one illustrative example, tray 124 is configured to slide into base 126.

Front rail 104 is associated with first roller track 112 and second roller track 114. Front rail 104 is configured to align the respective ends of first roller track 112 and second roller track 114.

Front rail 104 is also associated with display front 110. Display front 110 is configured to stop products at the front of roller shelf 100. Display front 110 is further configured to allow consumers to view products on roller shelf 100.

Back rail 106 is also associated with first roller track 112 and second roller track 114. Back rail 106 is configured to align the respective ends of first roller track 112 and second roller track 114 which are opposite front rail 104.

Dividers 108 are configured to guide products as the products travel from the back of roller shelf 100 to the front of roller shelf 100. Dividers 108 may be associated with first roller track 112, second roller track 114, neither, or both.

The illustration of roller shelf 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, roller tracks 102 may comprise more than two roller tracks. Further, front rail 104 and display front 114 may be combined into one component. Yet further, back rail 106 may be eliminated.

Figure 2:
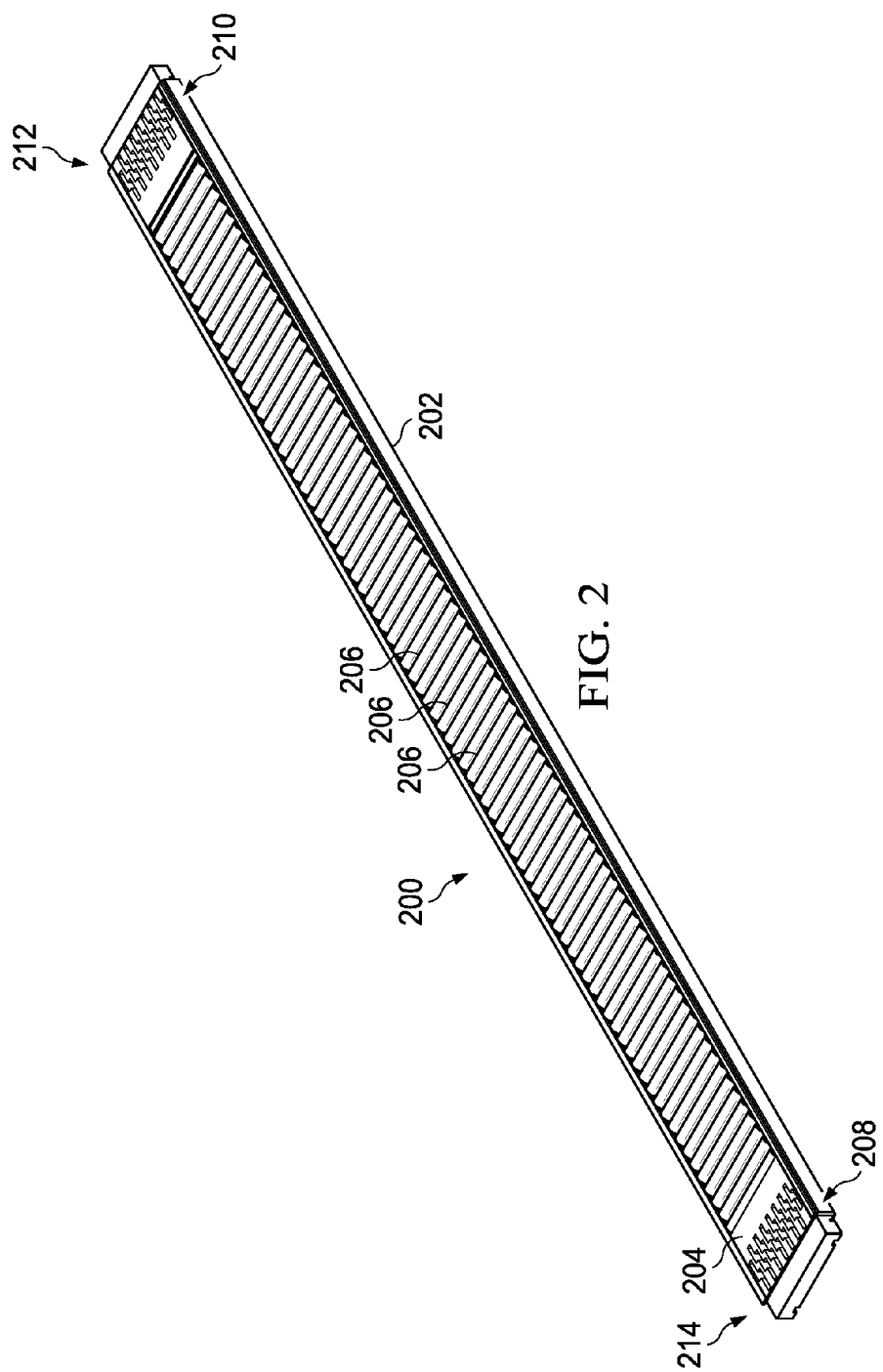
FIG. 2 is an illustration of a roller track in accordance with an illustrative embodiment.

Turning now to FIG. 2, an illustration of a roller track is depicted in accordance with an illustrative embodiment. Roller track 200 may be first roller track 112 of FIG. 1. Roller track 200, comprises base 202, tray 204, and rollers 206.

In this illustrative embodiment, rollers 206 are seated in tray 204. Tray 204 is configured to slide into base 202. Base 202 has first entry 208 and second entry 210. As depicted tray 204 may be slid into base 202 from either first entry 208 or second entry 210 of base 202. Further, tray 204 has first end 212 and second end 214. In this illustrative example, either first end 212 or second end 214 may initially enter base 202. Accordingly, roller track 200 may be assembled by placing rollers 206 into tray 204 and sliding tray 204 into base 202.

Figure 3:
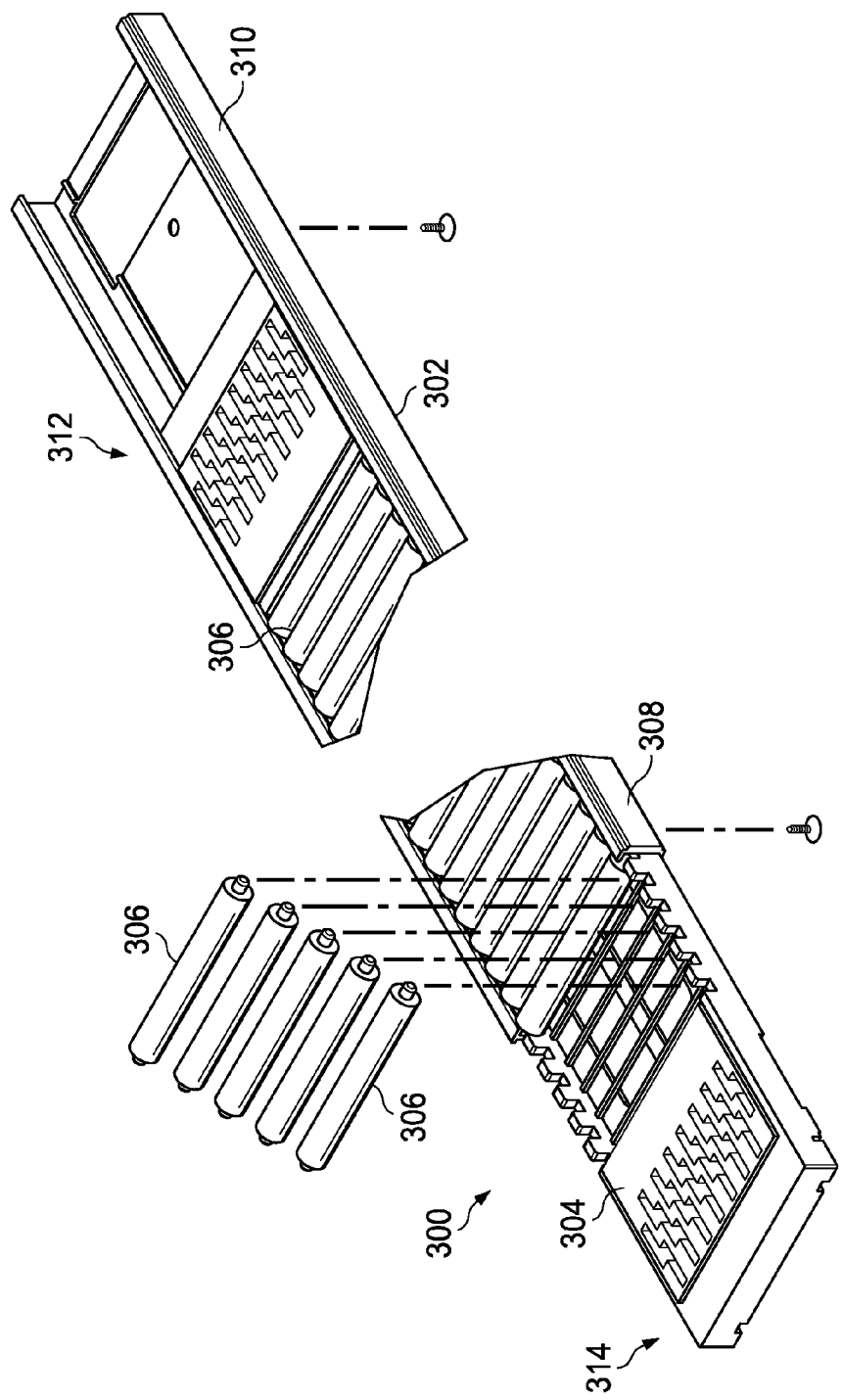
FIG. 3 is an illustration of assembling a roller track in accordance with an illustrative embodiment.

An illustration of assembling a roller track in accordance with an illustrative embodiment is depicted in FIG. 3. In this illustration, roller track 300, comprises base 302, tray 304, and rollers 306.

Rollers 306 are seated in tray 304. All rollers 306 may be placed in tray 304 prior to inserting tray 304 into base 302. Alternatively, rollers 306 may be placed in tray 304. As shown, rollers 306 are placed in notches formed in tray 304.

Rollers 306 may be placed into or removed from, tray 304 prior to inserting tray 304 into base 302. Once a portion of tray 304 is inserted into base 302, base 302 prohibits removal of rollers 306 from that portion of tray 304.

As depicted, tray 304 is slid into first entry 308 of base 302. However, tray 304 may be slid into base 302 from either first entry 308 or second entry 310 of base 302. Further, although first end 312 of tray 304 is depicted as being slid into base 302, either first end 312 or second end 314 may initially enter base 302.

Figure 4:
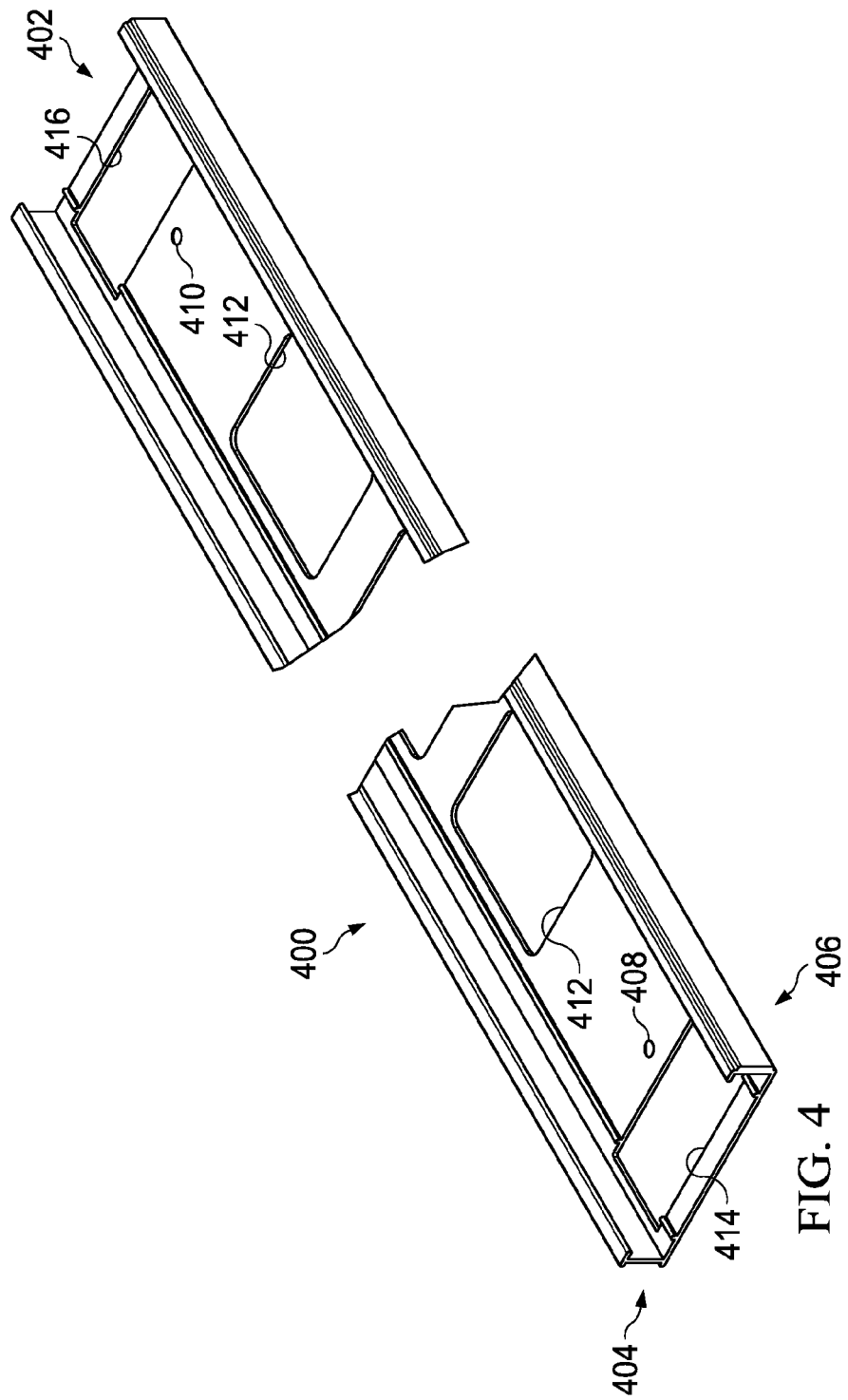
FIG. 4 is an illustration of a base of a roller track in accordance with an illustrative embodiment.

With reference now to FIG. 4, an illustration of a base of a roller track is depicted in accordance with an illustrative embodiment. Base 400 may be base 120 of FIG. 1. As depicted, base 400 comprises a single piece of material. However, in other illustrative embodiments, base 400 may comprise a plurality of combined pieces. Base 400 and its features may be formed through extrusion, machining, welding, molding, or any known manufacturing process.

Base 400 may be constructed of any suitable material. Material of base 400 may be selected based upon material strength, to minimize manufacturing costs, to minimize weight, to promote easy cleaning, or any combination of these considerations and other considerations. In one illustrative embodiment, base 400 is made of a lightweight metal, such as aluminum.

As depicted, base 400 comprises bottom 402, first wall 404, and second wall 406. Bottom 402 of base 400 comprises a plurality of apertures 412. Apertures 412 reduce the amount of material comprising base 400, and also the weight of base 400. Apertures 412 also provide a flow path for any materials spilled onto base 400. Although as depicted, apertures 412 are identical, apertures 412 need not be identical. Apertures 412 may instead be of varying size, shape, and/or location.

Bottom 402 of base 400 further comprises openings 414 and 416. Openings 414 and 416, like apertures 412, are configured to reduce the amount of material comprising base 400, and provide a flow path for any materials spilled onto base 400. Openings 414 and 416 are further configured to underlie slots in a tray, such as tray 204 of FIG. 2. Accordingly, openings 414 and 416 allow dividers, such as dividers 108 of FIG. 1 to engage slots without interference by base 400. Further, openings 414 and 416 enable base 400 to extend nearly the full length of a tray.

In this illustrative embodiment, bottom 402 further comprises first anchoring point 408 and second anchoring point 410. First anchoring point 408 and second anchoring point 410 are configured to secure a tray, such as tray 204 of FIG. 2, within base 400. As depicted, first anchoring point 408 and second anchoring point 410 are holes in bottom 402. Accordingly, in this illustrative embodiment, a screw or other fastener may be inserted through first anchoring point 408 or second anchoring point 410 to engage a tray. In other illustrative embodiments, first anchoring point 408 and second anchoring point 410 may include clamps, adhesive, or other securing mechanisms.

As depicted, bottom 402 extends substantially beyond first anchoring point 408 and second anchoring point 410. Accordingly, bottom 402 provides structural support to substantially all of a tray within base 400. Further, the extension of bottom 402 substantially beyond first anchoring point 408 and second anchoring point 410 reduces stress applied to any fastener present in first anchoring point 408 or second anchoring point 410. Extension of bottom 402 beyond first anchoring point 408 and second anchoring point 410 may result in a stronger roller track than a roller track with a bottom which does not extend beyond its anchoring points.

Figure 5:
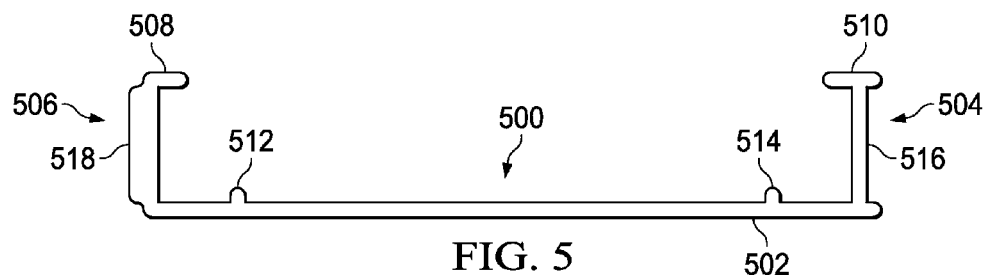
FIG. 5 is an illustration of the front face of a base of a roller track in accordance with an illustrative embodiment.

Turning now to FIG. 5, an illustration of a front face of a base of a roller track is depicted in accordance with an illustrative embodiment. As depicted, base 500 comprises bottom 502, first wall 504, and second wall 506.

As depicted, bottom 502 comprises first guide 512 and second guide 514. First guide 512 and second guide 514 may be configured to direct the entry and sliding of a tray, such as tray 204 of FIG. 2 through base 500. First guide 512 and second guide 514 may be configured to engage corresponding features of a tray.

Although first guide 512 and second guide 514 are depicted as ridges of circular cross-section, first guide 512 and second guide 514 may instead be a different cross-sectional shape, or a different cross-sectional size. Likewise, although in this illustrative embodiment, first guide 512 and second guide 514 extend the length of bottom 502, in alternative embodiments first guide 512 and second guide 514 need not extend the whole length of base 500. Further, although first guide 512 and second guide 514 are depicted as identical, first guide 512 and second guide 514 may instead be of different cross-sectional shapes, different lengths, or different cross-sectional sizes.

Base 500 also comprises first wall 504 and second wall 506. First wall 504 and second wall 506 may comprise features which retain rollers within a tray. First wall 504 and second wall 506 may also comprise features which allow for base 500 to be associated with other bases. In this embodiment, first wall 504 comprises flange 510 and groove 516 while second wall 506 comprises flange 508 and tongue 518.

In this illustrative embodiment, flange 510 and flange 508 extend inward from first wall 504 and second wall 506 respectively, over bottom portion 502. Flange 510 and flange 508 are configured to retain rollers, such as rollers 206 of FIG. 2 within a tray, such as tray 204 of FIG. 2. Flange 510 and flange 508 are further configured to allow free rotation of the rollers.

Tongue 518 and groove 516 are configured to associate base 500 with other bases. For example, in assembling a roller shelf, base 500 may be placed beside a second base. Tongue 518 of base 500 may engage the respective groove of the second base. The engagement of tongue 518 and the respective groove restrains vertical movement of base 500 in relation to the second base.

Figure 6:
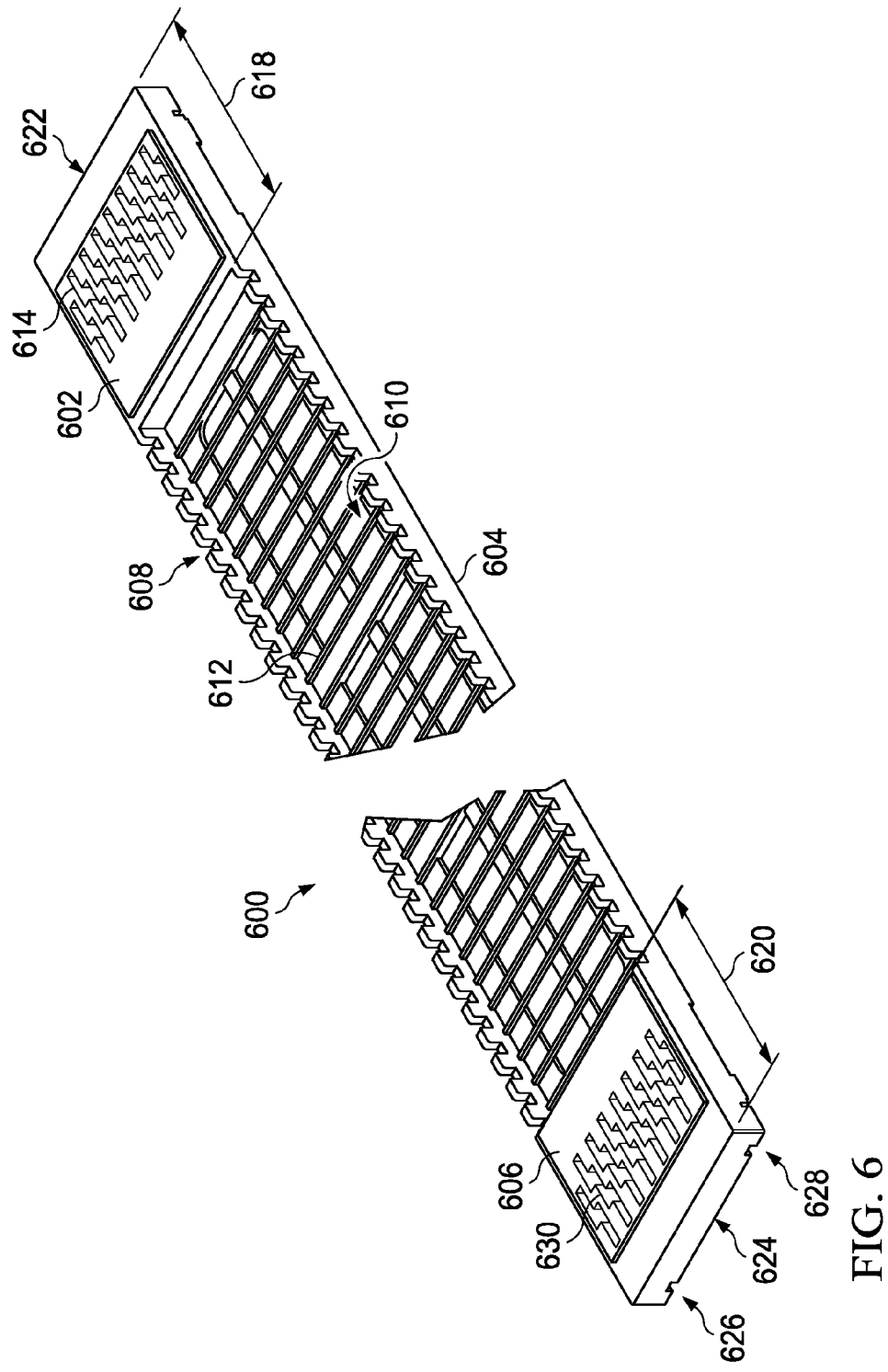
FIG. 6 is an illustration of a tray of a roller track in accordance with an illustrative embodiment.

With reference now to FIG. 6, an illustration of a tray of a roller track is depicted in accordance with an illustrative embodiment. Tray 600 is configured to slide into a base, such as base 400 of FIG. 4. Tray 600 may be tray 204 of FIG. 2.

Tray 600 may be manufactured through machining, molding, or any other manufacturing process. Material of tray 600 may be selected based upon required sterility, material durability, material strength, to minimize weight, to promote easy cleaning, or any combination of these considerations and other considerations. In one illustrative embodiment, tray 600 may comprise a polymer, such as, without limitation, acrylonitrile butadiene styrene, polyoxymethylene, polycarbonate, and any other appropriate polymeric material.

Although tray 600 is depicted as one piece, in other illustrative embodiments, tray 600 may comprise a number of combined pieces. As depicted, tray 600 comprises first end 602, center 604, and second end 606.

Center 604 may be configured to hold rollers such as rollers 116 of FIG. 1. In this illustrative embodiment, notches 608 of center 604 are each configured to support a single roller. Notches 608 are further configured to allow free rotation of the rollers.

Center 604 further comprises apertures 610 and rails 612. Apertures 610 reduce the amount of material comprising tray 600. Apertures 610 also provide a flow path for any materials spilled onto tray 600. Further, in some illustrative embodiments, tray 600 may be placed within a refrigeration unit. If tray 600 is placed within a refrigeration unit, apertures 610 provide a flow path for refrigerated air. Rails 612, which extend over apertures 610, offer structural support to tray 600. Tray 600 also comprises first end 602. First end 602 has slots 614, length 618, and ledge 622. Slots 614 are configured to engage dividers, such as dividers 108 of FIG. 1. As depicted, each slot in slots 614 is a zigzag shape. The zigzag shape allows dividers to be placed in a plurality of horizontal locations relative to tray 600. Further, the zigzag shape provides a plurality of horizontal locations without comprising the structural integrity of tray 600 or presenting substantial manufacturing burdens.

Further, the zigzag shape may allow a divider comprising multiple offset projections on each end to engage slots 614. Dividers comprising multiple offset projections on each end may provide a stronger divider than a divider with a single projection on each end.

Although slots 614 are depicted as a zigzag shape, in other illustrative embodiments, slots 614 may instead comprise another shape. For example, slots 614 may instead be rectangular. Further, in other illustrative embodiments, slots 614 may comprise a plurality of different shapes.

First end 602 also has length 618. As depicted, length 618 is longer than length 620 of second end 606. However, in some illustrative embodiments, length 618 may be the same as or shorter than length 620 of second end 606.

First end also has ledge 622. As depicted, first end 602 is configured to engage one of a front rail and a back rail using ledge 622. Ledge 622 is configured to slide into one of a front rail and a back rail, such as front rail 104 and back rail 106 of FIG. 1. Further, if tray 600 is configured to slide into a base from either entry of the base, both a front rail and a back rail are configured to hold ledge 622.

Second end 606 comprises length 620, ledge 624, and slots 630. Tray 600 is also configured to be slid into one of a front rail and a back rail, such as front rail 104 and back rail 106 of FIG. 1, using ledge 624 of second end 606.

Slots 630 are configured to engage dividers, such as dividers 108 of FIG. 1. As depicted, slots 630 comprise a zigzag shape. Although in this illustrative embodiment slots 630 are identical to slots 614, slots 630 and slots 614 may instead have different characteristics. For example, slots 630 may be longer than slots 614. Additionally, slots 630 may be a different shape than slots 614.

Not all slots within slots 614 need be identical. For example, as depicted, the outermost slots of slots 614 are shorter than the inner slots of slots 614. Having slots of different lengths or sizes may allow a greater number of slots to be present in tray 600.

As depicted, the bottom of tray 600 comprises channels 626 and 628. Channels 626 and 628 may maintain the position of tray 600 within a base. Further, channels 626 and 628 may align tray 600 as it is slid into a base.

Although channels 626 and 628 are depicted as rectangular, channels 626 and 628 may instead be a different cross-sectional shape, or a different cross-sectional size. Further, channels 626 and 628 may be complementary in shape to corresponding features of a base. For example, channels 626 and 628 may be complementary in shape to guides of a base, such as first guide 512 and second guide 514 of FIG. 5. Yet further, although base 600 comprises two channels, in other exemplary embodiments greater or fewer channels may be present.

Figure 7:
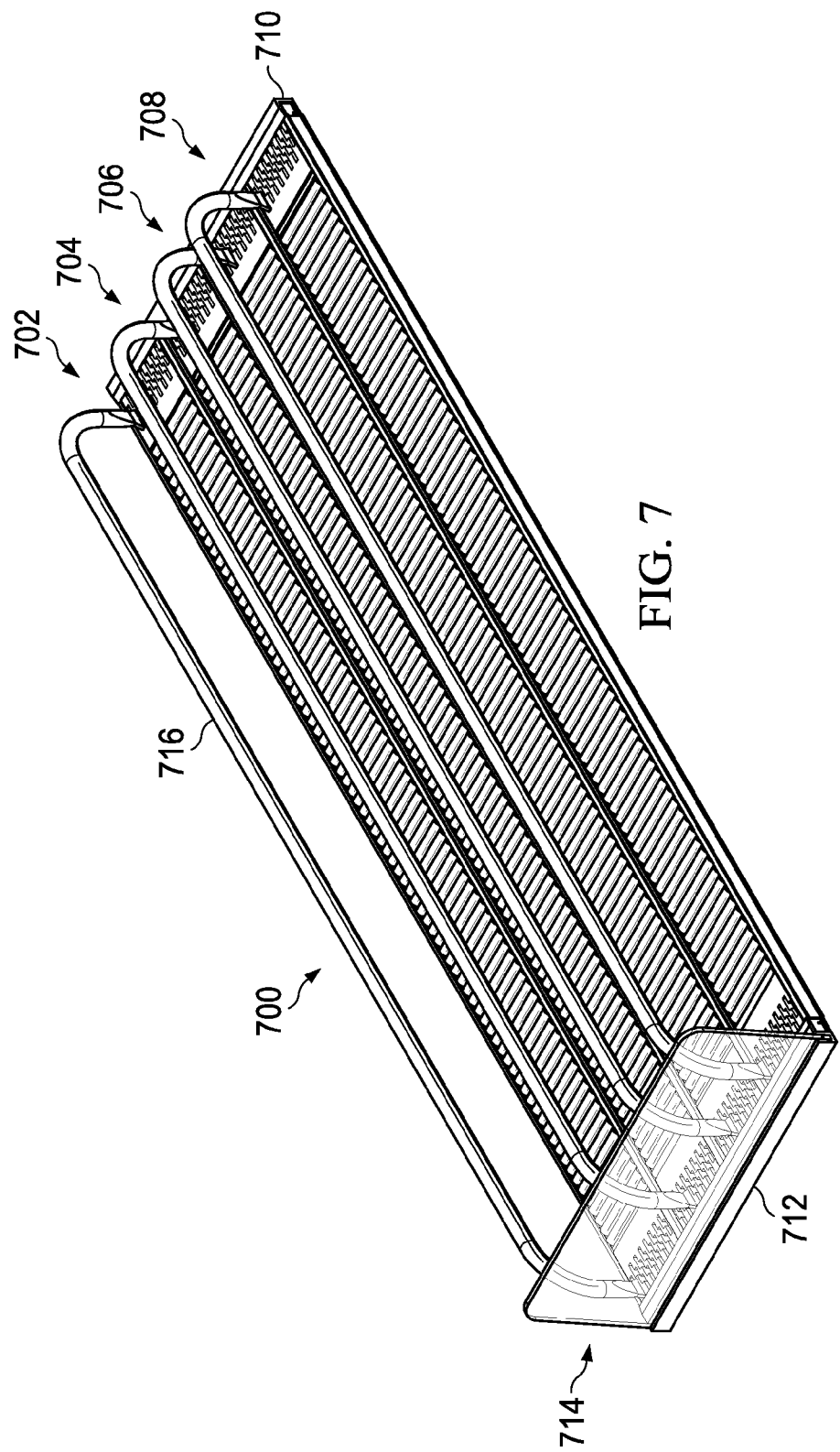
FIG. 7 is an illustration of a roller shelf in accordance with an illustrative embodiment.

With reference now to FIG. 7, an illustration of a roller shelf is depicted in accordance with an illustrative embodiment. Roller shelf 700 comprises roller tracks 702, 704, 706, and 708; back rail 710; front rail 712; display front 714; and divider 716.

As illustrated, roller tracks 702, 704, 706, and 708 are placed adjacent to each other. Each roller track may comprise a tongue and groove connector such as tongue 518 and groove 516 of FIG. 5. Accordingly, roller tracks 702, 704, 706, and 708 may be restrained from moving vertically relative to each other prior to fully assembling roller shelf 700.

As depicted, portions of roller tracks 702, 704, 706, and 708 are placed into back rail 710. These portions may be ledge 622 or ledge 624 of FIG. 6. Back rail 710 may be back rail 106 of FIG. 1.

Back rail 710 is configured to align respective ends of roller tracks 702, 704, 706, and 708. Back rail 710 may also be configured to secure the respective ends of roller tracks 702, 704, 706, and 708 within designated positions. In one illustrative example, when all the respective ends of roller tracks 702, 704, 706, and 708 are aligned, screws secure roller tracks 702, 704, 706, and 708 to the back rail 710.

As depicted, portions of roller tracks 702, 704, 706, and 708 are placed into front rail 712. These portions may be ledge 622 or ledge 624 of FIG. 6, or other features of roller tracks 702, 704, 706, and 708. Front rail 712 may be front rail 104 of FIG. 1.

Front rail 712 is configured to align respective ends of roller tracks 702, 704, 706, and 708. Front rail 712 may also be configured to secure the respective ends of roller tracks 702, 704, 706, and 708 within designated positions.

Further, front rail 712 is configured to hold display front 714. Display front 714 is configured to provide a stop for products traveling down roller shelf 700. Accordingly, display front 714 inhibits products stored on roller shelf 700 from falling off of roller shelf 700. Additionally, display front 714 may be configured to prevent inadvertent removal of display front 714 from roller shelf 700.

As illustrated, display front 714 is configured at an angle less than ninety degrees relative to roller tracks 702, 704, 706, and 708. However, in alternative embodiments, display front 714 may be configured relative to roller tracks 702, 704, 706, and 708 at angles equal to or greater than ninety degrees. The angle of display front 714 relative to roller tracks 702, 704, 706, and 708 may be selected based on installed angle of roller shelf 700, products to be stored on roller shelf 700, or other considerations.

As depicted, display front 714 is substantially transparent. As display front 714 is substantially transparent, consumers may view products which are present on roller shelf 700 through display front 714. In alternative embodiments, display front 714 may instead be substantially translucent or may instead be opaque.

As depicted, each of the roller tracks 702, 704, 706, and 708 of roller shelf 700 contains one of dividers 716. Dividers 716 are inserted into roller shelf 700 via slots in roller tracks 702, 704, 706, and 708. Dividers may be placed within any of slots in order to accommodate different sizes of products on roller shelf 700.

Although as depicted a single divider of dividers 716 are present in each of roller tracks 702, 704, 706, and 708, greater or fewer dividers may be present in each roller track. For example, two dividers may be present in roller track 702, while no dividers may be present in roller track 706. Further, in an alternative embodiment, roller shelf 700 may accommodate products without dividers.

Figure 8:
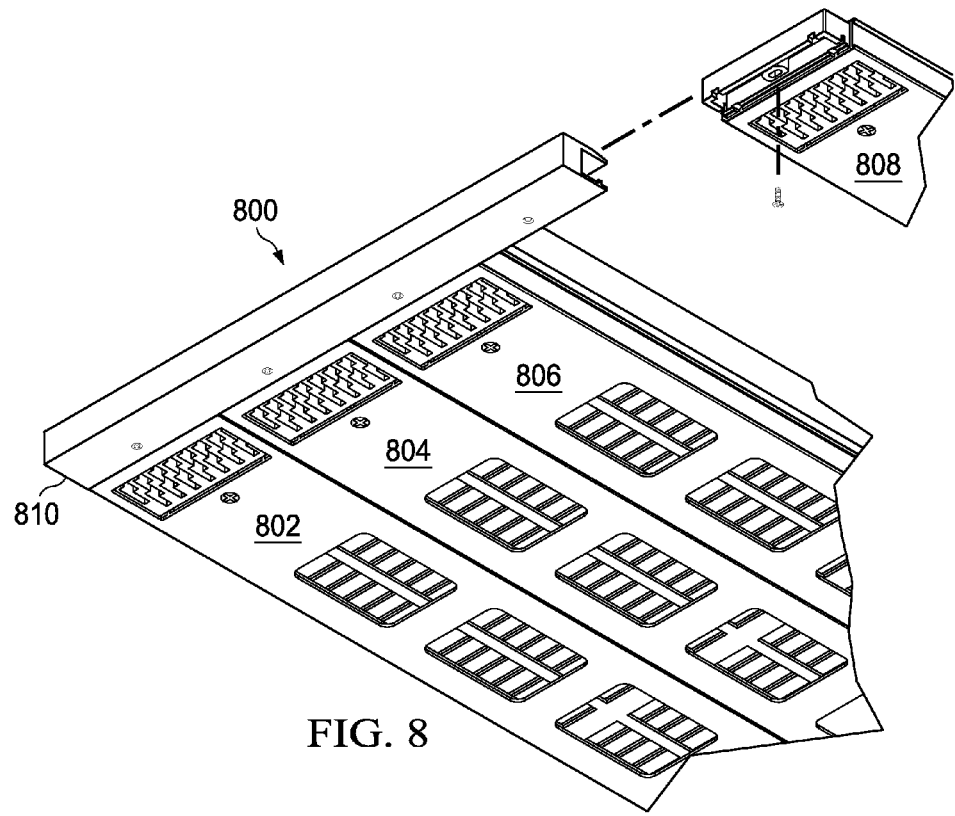
FIG. 8 is a bottom view illustration of assembling a roller shelf in accordance with an illustrative embodiment.

With reference now to FIG. 8, an illustration of assembling a roller shelf is depicted in accordance with an illustrative embodiment. Roller shelf 800 comprises roller tracks 802, 804, and 806 and back rail 810. As depicted, each roller track 802, 804, and 806 have been slid into back rail 810 and secured with a screw.

As depicted, roller track 808 may also be slid into back rail 810. In this illustration, roller track 808 and back rail 810 comprise complementary features. Such features may comprise channels or ridges to align roller track 808 within back rail 810. Such features may also prevent inadvertent removal of roller track 808.

In assembling a roller shelf, a roller track, such as roller track 802, may be slid into back rail 810 and a front rail simultaneously. Accordingly, each subsequent roller track would also enter back rail 810 and the front rail in one motion. Accordingly, when roller track 808 enters back rail 810, as depicted, roller track 808 also enters a front rail.

Alternatively, all desired roller tracks may be added to one rail at a time. For example, each roller track 802, 804, and 806 may be only slid into back rail 810. After roller track 808 is slid into back rail 810 and secured, all roller tracks are secured to back rail 810. However, roller tracks 802, 804, 806, and 808 are not secured to a front rail. Now roller tracks 802, 804, 806, and 808 may all be slid into a front rail. The design of front and back rails are discussed more in detail in FIGS. 9 and 10.

Figure 9:
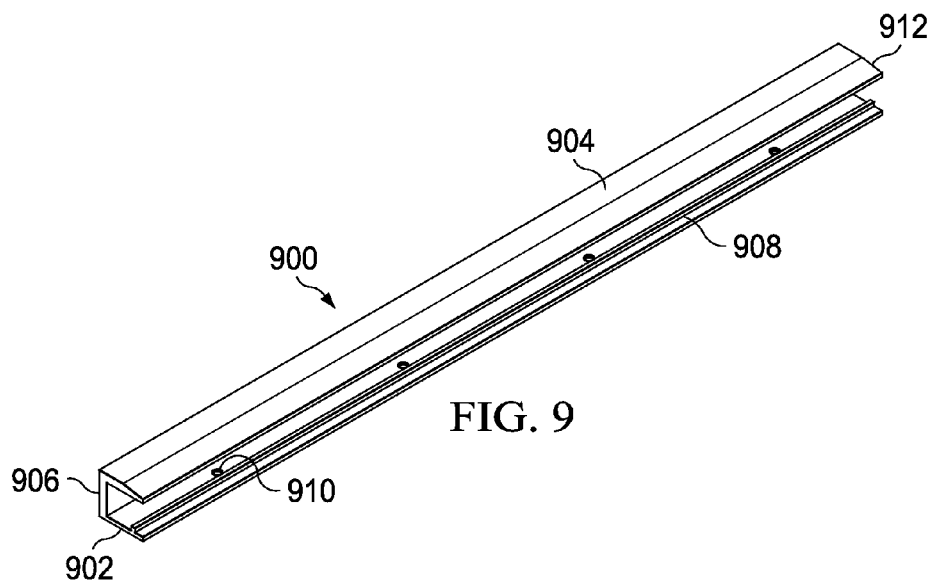
FIG. 9 is an illustration of a back rail of a roller shelf in accordance with an illustrative embodiment.

With reference now to FIG. 9, an illustration of a back rail of a roller shelf is depicted in accordance with an illustrative embodiment. Back rail 900 may be back rail 106 of FIG. 1 or back rail 710 of FIG. 7. Back rail 900 comprises bottom 902, top 904, and side 906.

Materials of back rail 900 may be selected based on material strength, to minimize manufacturing costs, to minimize weight, or any combination of these considerations and other considerations. In one illustrative embodiment, back rail 900 is substantially aluminum.

Back rail 900 is configured to align respective ends of roller tracks such as roller tracks 702, 704, 706, and 708 of FIG. 7. Accordingly, back rail 900 is configured to allow portions of roller tracks to slide into back rail 900. The portions of the roller tracks may be ledge 622 or ledge 624 of FIG. 6, or other portions of roller tracks.

Bottom 902 comprises ridge 908. Ridge 908 is configured to guide a roller track as the roller track is slid into back rail 900. In guiding the roller track, ridge 908 may engage a corresponding feature of the roller track.

Bottom 902 further comprises anchoring points 910. Anchoring points 910 may be used to secure roller tracks in respective positions within back rail 900. For example, in some illustrative embodiments anchoring points 910 comprise holes. Accordingly, in these embodiments, after a roller track is slid into back rail 900 and is at a desired position, a screw may secure back rail 900 to the roller track through a respective anchoring point. In other illustrative embodiments, anchoring points 910 may include clamps, adhesive, or other securing mechanisms.

Top 904 of back rail 900 comprises slope 912. Slope 912 is configured to ease the transition for products from back rail 900 to the roller tracks. By easing the transition, slope 912 may reduce the jostling of products and noise of operation of the roller tracks.

Figure 10:
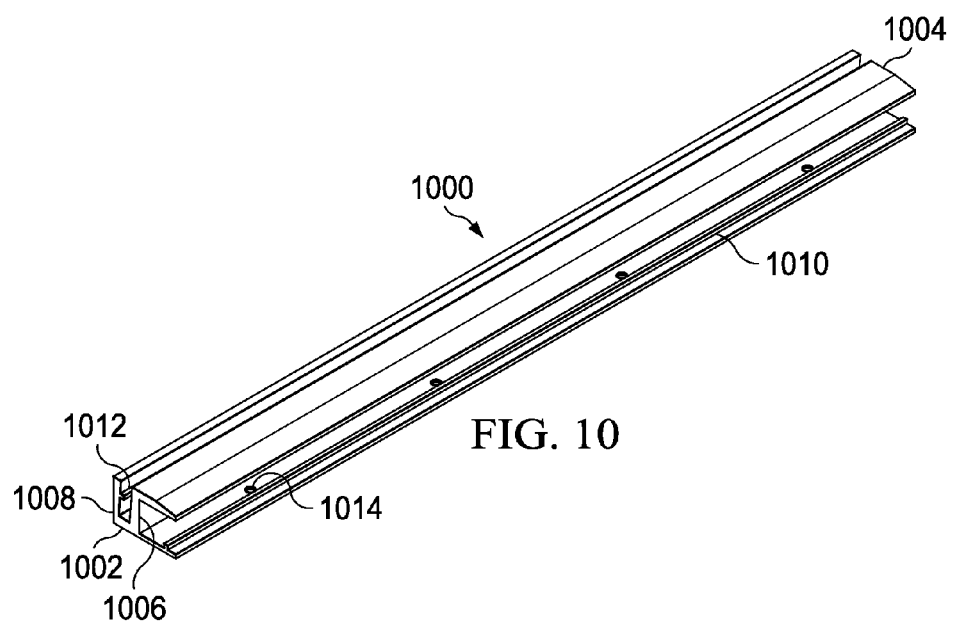
FIG. 10 is an illustration of a front rail of a roller shelf in accordance with an illustrative embodiment.

With reference now to FIG. 10, an illustration of a front rail of a roller shelf is depicted in accordance with an illustrative embodiment. Front rail 1000 may be front rail 104 of FIG. 1 or front rail 712 of FIG. 7. Front rail comprises bottom 1002, top 1004, center 1006, and side 1008.

Front rail 1000 is configured to align respective ends of roller tracks such as roller tracks 702, 704, 706, and 708 of FIG. 7. Accordingly, front rail 1000 is configured to allow portions of roller tracks to slide into front rail 1000. The portions of the roller tracks may be ledge 622 or ledge 624 of FIG. 6, or other portions of roller tracks.

Bottom 1002 comprises ridge 1010. Ridge 1010 is configured to guide a roller track as the roller track is slid into front rail 1000. In guiding the roller track, ridge 1010 may engage a corresponding feature of the roller track.

Bottom 1002 further comprises anchoring points 1014. Anchoring points 1014 may be used to secure roller tracks in respective positions within front rail 1000. Although depicted as holes, in other illustrative embodiments, anchoring points 1014 may include clamps, adhesive, or other securing mechanisms.

Side 1008 comprises ridge 1012 and is configured to hold a display front, such as display front 714 of FIG. 7. Ridge 1012 may engage a corresponding feature of the display front. A display front may enter front rail 1000 by sliding between side 1008 and center 1006. As depicted, side 1008 and center 1006 are configured to hold a display front at an angle less than ninety degrees to roller tracks.

Figure 11:
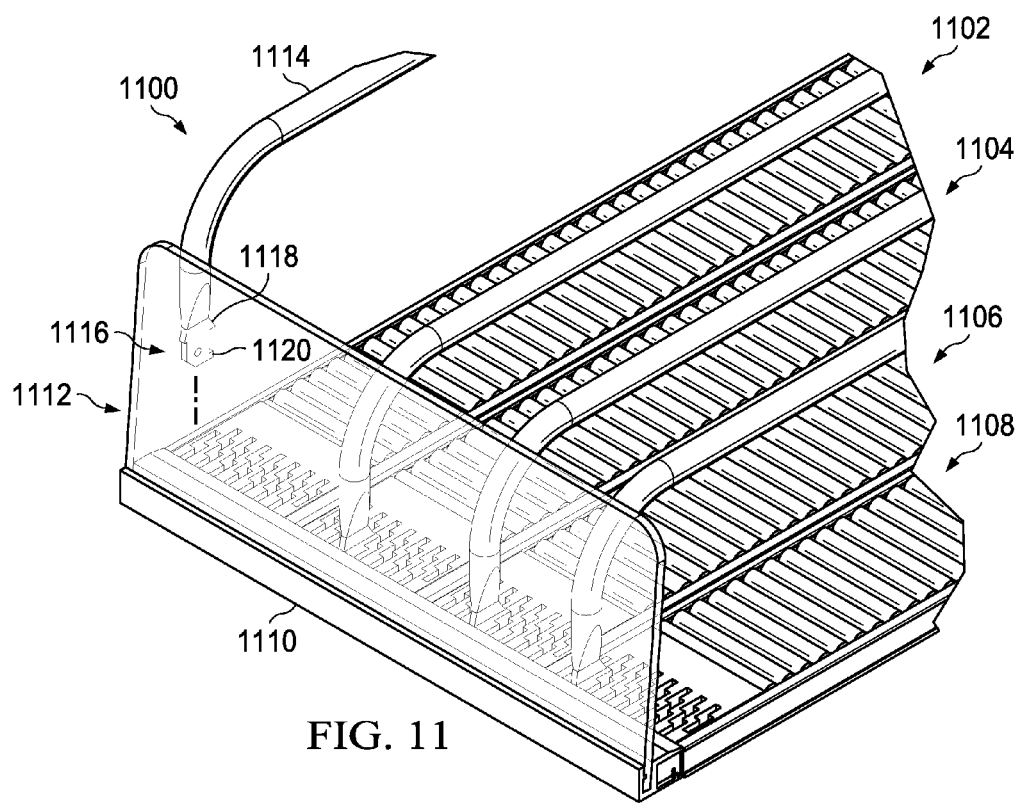
FIG. 11 is an illustration of inserting a divider into a roller shelf in accordance with an illustrative embodiment.

With reference now to FIG. 11, an illustration of inserting a divider into a roller shelf is depicted in accordance with an illustrative embodiment. Roller shelf 1100 comprises roller tracks 1102, 1104, 1106, and 1108. Front rail 1110 engages roller tracks 1102, 1104, 1106, and 1108 and display front 1112.

Divider 1114 will be inserted into the roller shelf to guide products which travel along the roller shelf. Divider 1114 is configured to engage slots, such as slots 614 of FIG. 6. Divider 1114 may be a divider in dividers 108 of FIG. 1.

As depicted, divider 1114 has projection 1116. Projection 1116 is configured to enter a slot of a roller track. Projection 1116 comprises latches 1118 and 1120. Latches 1118 and 1120 are configured to prevent inadvertent removal of divider 1114 from a roller track.

Although not depicted, divider 1114 comprises a second end which also comprises a projection. The second projection may be identical to projection 1116 but need not be identical. Further, the second projection may also comprise corresponding latches. Corresponding latches may be configured to prevent inadvertent removal of divider 1114 from a roller track.

In this illustrative embodiment, divider 1114 is placed into roller track 1102 by placing projection 1116 into a slot of roller track 1102. After projection 1116, is placed downward into the slot, divider 1114 may be pushed so that projection 1116 moves towards the center portion of the tray of the roller track. When divider 1114 is pushed, latches 1118 and 1120 resist vertical movement of divider 1114. For example, if projection 1116 were pushed towards the center portion of the tray of the roller track, latch 1120 would slide under the material of the tray and latch 1118 would slide over the material of the tray. Latch 1118 would then resist downward movement of divider 1114, while latch 1120 would resist upward movement of divider 1114.

In the above example, the second projection of the second side of divider 1116, although not depicted, is also placed into a corresponding slot of roller track 1102. Accordingly, both sides of divider 1116 engage roller track 1102.

Further, if the second projection of divider 1114 also comprises corresponding latches, divider 1114 may instead be pushed so that projection 1116 moves away from the center portion of the tray of the roller track. In such an example, the corresponding latches of the second projection would resist movement of the divider 1114 upwards or downwards.

Figure 12:
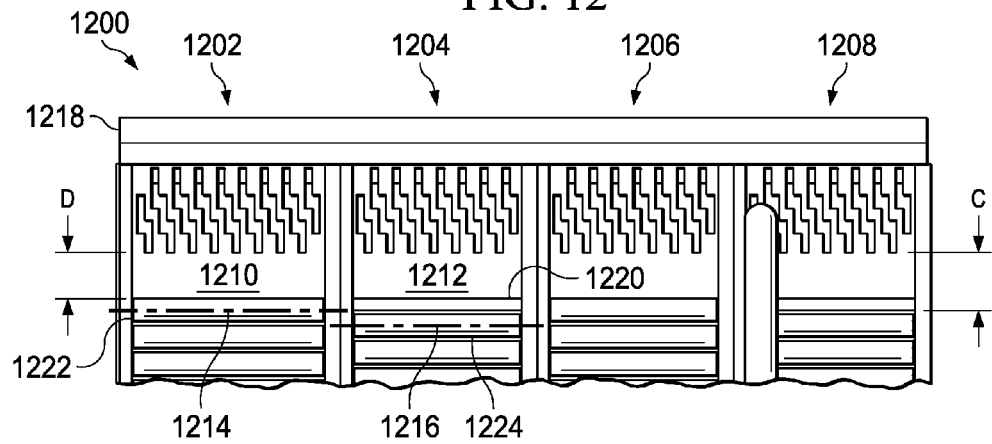
FIG. 12 is an illustration of a series of roller tracks in a roller shelf in accordance with an illustrative embodiment.

With reference now to FIG. 12, an illustration of a series of roller tracks in a roller shelf is depicted in accordance with an illustrative embodiment. Roller shelf 1200 may be roller shelf 100 of FIG. 1 or roller shelf 700 of FIG. 7.

As depicted, roller tracks 1202, 1204, 1206, and 1208 are aligned within back rail 1218. In this illustrative embodiment, roller track 1202 is wider than adjacent roller track 1204. For example, roller track 1202 may be three inches wide while roller track 1204 may be two inches wide. Providing wider roller tracks, such as roller track 1202, may reduce the number of necessary roller tracks and therefore reduce assembly cost and time. For example, a retail store may wish to order a roller shelf which is twenty four inches wide. If the shelf comprised only three inch roller tracks, eight of such roller tracks would be required. If the shelf comprised only two inch roller tracks, twelve of such roller tracks would be required. If the shelf comprised only four inch roller tracks, six of such roller tracks would be required. Accordingly, by providing different widths of roller tracks, manufacturing costs may be reduced as the time required to build and assemble a roller shelf may be reduced.

Additionally, providing different widths of roller tracks allows for a larger variety of possible roller shelf widths. For example, using three inch roller tracks and two inch roller tracks, a roller shelf of twenty three inches in width may be created. However, using only two inch roller tracks or only three inch roller tracks, a roller shelf of twenty three inches would not be possible.

Further, as depicted, the tray of roller track 1202 is oriented in the opposite direction of the tray of roller track 1204. In this illustrative embodiment, second end 1210 of roller track 1202 is in contact with back rail 1218. However, first end 1212 of roller track 1204 is in contact with back rail 1218. First end 1212 may be first end 602 of FIG. 6. Second end 1210 may be second end 606 of FIG. 6.

As depicted, first end 1212 and second end 1210 are not identical. First end 1212 comprises block 1220 which increases the distance, C, between slots of first end 1212 and the first roller 1222 of roller track 1204. Second end 1210 does not comprise a block. Accordingly, the distance, D, between slots of second end 1210 and the first roller 1220 of roller track 1202 is shorter than distance C. In other words, first end 1212 and second end 1210 comprise different lengths.

As first end 1212 and second end 1210 comprise different lengths, the axes of rollers of roller track 1202 are offset from the axes of rollers of roller track 1204. For example, axis 1214 of first roller 1224 is offset from axis 1216 of first roller 1222.

Providing rollers with offset axes 1214 and 1216 reduces the noise of operation and reduces the jostling of products which travel down roller shelf 1200 using two roller tracks. For example, some noise of operation and jostling of products occurs as a product 'drops' into the spaces between the rollers as it travels down a roller shelf. The center of the roller is the highest point of a roller which contacts a product. When a product encounters rollers with offset axes, the product 'drops' a smaller distance than a product which encounters rollers with aligned axes. Reducing the distance a product 'drops' reduces the amount a product is jostled resulting in a reduction of noise in operation. Reducing the distance a product 'drops' also reduces the friction imposed on the product. As a result, offset axes 1214 and 1216 may improve the speed products travel down roller shelf 1200.

Thus, the illustrative embodiments provide an apparatus for storing products. Further, the illustrative embodiments also may be used to maintain the presence of products at the front of a product display.

The illustrative embodiments provide an apparatus that allows for a reduction in the amount of jostling of shelved products. The illustrative embodiments also provide an apparatus that allows for greater flexibility in placement of dividers. Additionally, the illustrative embodiments provide an apparatus which provides greater structural support. The illustrative embodiments further provide an apparatus that reduces the stress on anchoring points.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A roller track comprising:
   a base having a first opening and a second opening;
   a tray configured to slide into the base, the tray comprising:
      a first end,
      a center portion comprising a plurality of notches,
      a second end,
      wherein the first end and the second end comprise a plurality of slots, at least a first number of slots in the first end have a zig zag configuration and at least a second number of slots in the second end have a zig zag configuration;
   a plurality of rollers, the plurality of rollers configured to engage the plurality of notches; and
   a number of dividers having a projection at a first end of the divider and a projection at the second end of the divider, each projection having at least one latch, a projection and latch at a first end of the divider engaging a slot having a zig zag configuration in the first end of the tray, and a projection and latch at a second end of the divider engaging a slot having a zig zag configuration in the first end of the tray, the zig zag shape in the first end and the second end allowing the number of dividers to be placed in a plurality of horizontal locations relative to tray,
   the first opening of the base positioned to underlie the first number of slots such that the projection at the first end of the divider engages the slot without interference, and the second opening of the base positioned to underlie the second number of slots such that the projection at the second end of the divider engages the slot without interference, the projection preventing inadvertent removal of the divider, wherein a projection of a divider resides in a slot of the plurality of slots, and wherein the projection comprises a different shape than a shape of the slot of the plurality of slots.

2. The roller track of claim 1, wherein the base extends past a beginning of at least one slot of the plurality of slots, wherein the beginning of the at least one slot of the plurality of slots comprises a location of the at least one slot of the plurality of slots closest to the center portion.

3. The roller track of claim 1, wherein the plurality of slots comprises at least two sizes of slots.

4. The roller track of claim 1, wherein the zig zag shape of the first number of slots and the second number of slots allows the number of dividers to be placed in a plurality of horizontal locations relative to the tray.

5. The roller track of claim 1, wherein the first end and the second end comprise respectively different lengths.

6. The roller track of claim 1, wherein the tray is substantially composed of a polymer.

7. A roller shelf comprising:
   a first roller track, the first roller track comprising:
      a first base having a first opening and a second opening;
      a first tray configured to slide into the first base, the first tray comprising:
         a first end,
         a first center portion comprising a first plurality of notches, and
         a second end;
      a first plurality of rollers, wherein the first plurality of rollers are configured to engage the first plurality of notches;
      wherein the first end and the second end of the first tray comprise a plurality of slots, at least a first number of slots in the first end have a zig zag configuration and at least a second number of slots in the second end have a zig zag configuration;
      a first number of dividers having a projection at a first end of the divider and a projection at the second end of the divider, each projection having at least one latch, a projection at a first end of the divider engaging a slot having a zig zag configuration in the first end of the tray, and a projection at a second end of the divider engaging a slot having a zig zag configuration in the first end of the tray, the first opening positioned to underlie the first number of slots such that the projection at the first end of the divider engages the slot without interference, and the second opening positioned to underlie the second number of slots such that the projection at the second end of the divider engages the slot without interference, wherein a projection of a divider resides in a slot of the plurality of slots, and wherein the projection comprises a different shape than a shape of the slot of the plurality of slots, the projections comprise a number of latches preventing removal of the divider from the roller track;
   a first tongue and groove connector positioned on a side of the first tray;
   a second roller track, the second roller track comprising:
      a second base;
      a second tray configured to slide into the second base, the second tray comprising:
         a third end,
         a second center portion comprising a second plurality of notches, and
         a fourth end;
      a second plurality of rollers, wherein the second plurality of rollers are configured to engage the second plurality of notches;

wherein the first end and the second end of the second tray comprise a plurality of slots, at least a first number of slots in the first end have a zig zag configuration and at least a second number of slots in the second end have a zig zag configuration;

a second number of dividers having a projection at a first end of the divider and a projection at the second end of the divider, each projection having at least one latch, a projection at a first end of the divider engaging a slot having a zig zag configuration in the first end of the tray, and a projection at a second end of the divider engaging a slot having a zig zag configuration in the first end of the tray, the zig zag shape in the first end and the second end allowing the number of dividers to be placed in a plurality of horizontal locations relative to tray, the base having a first opening and a second opening, the first opening positioned to underlie the first number of slots such that the projection at the first end of the divider engages the slot without interference, and the second opening positioned to underlie the second number of slots such that the projection at the second end of the divider engages the slot without interference; and a second tongue and groove connector positioned on a side of the second tray, the first tongue and groove connector connected to the second tongue and groove connector;

wherein the first plurality of rollers are axially offset from the second plurality of rollers.

8. The roller shelf of claim 7, wherein the first end comprises a plurality of slots and at least one slot in the plurality of slots comprises a zigzag shape.

9. The roller shelf of claim 7, wherein:
the first end comprises a plurality of slots; and
the first base extends past a beginning of at least one slot of the plurality of slots, wherein the beginning of the at least one slot of the plurality of slots comprises a location of the at least one slot of the plurality of slots closest to the first center portion.

10. The roller shelf of claim 7, wherein:
the first end comprises a plurality of slots; and
the plurality of slots comprises at least two sizes of slots.

11. The roller shelf of claim 7, wherein:
the first end comprises a plurality of slots; and
a projection of a divider resides in a slot of the plurality of slots, and wherein the projection comprises a different shape than a shape of the slot of the plurality of slots.

12. The roller shelf of claim 7, further comprising a back rail, wherein the first end and the third end engage the back rail and the first end and the third end comprise respectively different lengths.

13. The roller shelf of claim 7, wherein an orientation of the first roller track in relation to the second roller track axially offsets the first plurality of rollers from the second plurality of rollers.

14. A roller track comprising:
a base;
a tray configured to slide into the base, the tray comprising:
a first end,
a center portion comprising a plurality of notches,
a second end,
wherein the first end and the second end comprise a plurality of slots, at least a first number of slots in the first end have a zig zag configuration and at least a second number of slots in the second end have a zig zag configuration;
a plurality of rollers, the plurality of rollers configured to engage the plurality of notches; and
a number of dividers having a projection at a first end of the divider and a projection at the second end of the divider, each projection having at least one latch, a projection and latch at a first end of the divider engaging a slot having a zig zag configuration in the first end of the tray, and a projection and latch at a second end of the divider engaging a slot having a zig zag configuration in the first end of the tray, the zig zag shape in the first end and the second end allowing the number of dividers to be placed in a plurality of horizontal locations relative to tray, the base having a first opening and a second opening, the first opening positioned to underlie the first number of slots such that the projection at the first end of the divider engages the slot without interference, and the second opening positioned to underlie the second number of slots such that the projection at the second end of the divider engages the slot without interference, wherein the zig zag shape of the first number of slots and the second number of slots allows the number of dividers to be placed in a plurality of horizontal locations relative to the tray, wherein a projection of a divider resides in a slot of the plurality of slots, and wherein the projection comprises a different shape than a shape of the slot of the plurality of slots, the projections comprise a number of latches preventing removal of the divider from the roller track.

15. The roller track of claim 14, wherein the base extends past a beginning of at least one slot of the plurality of slots, wherein the beginning of the at least one slot comprises a location of the at least one slot closest to the center portion.

16. The roller track of claim 14, wherein the plurality of slots comprises at least two sizes of slots.

17. The roller track of claim 14, wherein a projection of a divider resides in a slot of the plurality of slots, and wherein the projection comprises a different shape than a shape of the slot of the plurality of slots.

18. The roller track of claim 14, wherein the first end and the second end comprise respectively different lengths.

19. The roller track of claim 14, wherein the tray is substantially composed of a polymer.

* * * * *